US010146089B2

(12) United States Patent
Hong et al.

(10) Patent No.: US 10,146,089 B2
(45) Date of Patent: *Dec. 4, 2018

(54) CURVED DISPLAY DEVICE

(71) Applicant: Samsung Display Co., Ltd., Yongin-si (KR)

(72) Inventors: Sung Hee Hong, Hwaseong-si (KR); Jang-Il Kim, Asan-si (KR); Un Byoll Ko, Yeoju-si (KR); Sei-Yong Park, Suwon-si (KR); Jung Wook Lee, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,018

(22) Filed: Sep. 21, 2017

(65) Prior Publication Data

US 2018/0011377 A1   Jan. 11, 2018

Related U.S. Application Data

(63) Continuation of application No. 14/957,274, filed on Dec. 2, 2015, now Pat. No. 9,772,522.

(30) Foreign Application Priority Data

Jan. 6, 2015   (KR) .................. 10-2015-0001319

(51) Int. Cl.
   *G02F 1/1337* (2006.01)
   *G02F 1/1343* (2006.01)
(52) U.S. Cl.
   CPC .. *G02F 1/133707* (2013.01); *G02F 1/134309* (2013.01)

(58) Field of Classification Search
   CPC ............. G02F 1/133707; G02F 1/1368; G02F 1/134309
   See application file for complete search history.

(56) References Cited

U.S. PATENT DOCUMENTS 9,159,883 B2   10/2015   Jung et al.
9,772,522 B2 *  9/2017   Hong ................ G02F 1/134309
(Continued)

FOREIGN PATENT DOCUMENTS

JP   2007-333818   12/2007
JP   2009-150982    7/2009
(Continued)

OTHER PUBLICATIONS

Non-Final Office Action dated Nov. 4, 2016, in U.S. Appl. No. 14/957,247.
(Continued)

*Primary Examiner* — Dung Nguyen
(74) *Attorney, Agent, or Firm* — H.C. Park & Associates, PLC

(57) ABSTRACT

A curved display device including a first substrate, a thin film transistor (TFT) disposed on the first substrate, a pixel electrode connected to the TFT, a second substrate overlapping the first substrate, a liquid crystal layer disposed between the first and the second substrates, and a common electrode disposed between the second substrate and the liquid crystal layer, in which the pixel electrode includes a cross-shaped stem portion having a horizontal stem portion, a vertical stem portion, and a plurality of fine branches extending from the cross-shaped stem portion, at least one of the fine branches includes a first portion and a second portion having a width greater than that of the first portion, and an extending line from a boundary between the first portion and the second portion is sloped at an angle in a
(Continued)

range of −10 degrees to +10 degrees with respect to the vertical stem portion.

20 Claims, 14 Drawing Sheets

(56) References Cited

U.S. PATENT DOCUMENTS

| | | |
|---|---|---|
| 2009/0161048 A1 | 6/2009 | Satake et al. |
| 2010/0195034 A1 | 8/2010 | Lee et al. |
| 2013/0021570 A1 | 1/2013 | Zhang |

FOREIGN PATENT DOCUMENTS

| | | |
|---|---|---|
| JP | 2009-229667 | 10/2009 |
| KR | 10-2010-0089248 | 8/2010 |

OTHER PUBLICATIONS

Notice of Allowance dated May 30, 2017, in U.S. Appl. No. 14/957,247.

* cited by examiner

1

CURVED DISPLAY DEVICE

CROSS REFERENCE TO RELATED APPLICATION

This application is a Continuation of U.S. patent application Ser. No. 14/957,247, filed on Dec. 2, 2015, and claims the priority from and the benefit of Korean Patent Application No. 10-2015-0001319, filed on Jan. 6, 2015, which is hereby incorporated by reference for all purposes as if fully set forth herein.

BACKGROUND

Field

The present invention relates to a curved display device.

Discussion of the Background

A liquid crystal display (LCD), one of the most widely used flat panel displays (FPDs), includes two display substrates with field generating electrodes such as a pixel electrode, a common electrode, and the like, formed thereon and a liquid crystal layer interposed therebetween.

A voltage is applied to a field generating electrode to generate an electric field in a liquid crystal layer, whereby orientation of liquid crystal molecules of the liquid crystal layer is determined and polarization of incident light is controlled to display an image.

Among LCDs, a vertically aligned mode LCD, in which liquid crystal modules are aligned such that a longer axis thereof is perpendicular to upper and lower display substrates in a state in which an electric field is not applied, has come to prominence due to a large constant ratio and ease in realization of a wide reference viewing angle.

In such a vertically aligned mode LCD, a plurality of domains in which orientation directions of liquid crystal are different may be formed in a single pixel in order to realize a wide viewing angle.

In order to form a plurality of domains, a method of forming a cutout portion such as a fine slit, or the like, in a field generating electrode or forming a protrusion on a field generating electrode is used. In this method, liquid crystal is aligned in a direction perpendicular to a fringe field by the fringe field formed between the edge of the cutout portion or a protrusion and a field generating electrode facing the edge, thus forming a plurality of domains.

However, application of an LCD including such pretilting to a curved display device may generate texture due to misalignment and result in a reduction in transmittance.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a curved display device having advantages of improving a display defect such as texture or spot due to misalignment.

An exemplary embodiment of the present invention provides a curved display device including: a first substrate; a thin film transistor (TFT) disposed on the first substrate; a pixel electrode connected to the TFT; a second substrate facing the first substrate; a common electrode positioned on the second substrate; and a liquid crystal layer interposed between the first substrate and the second substrate, wherein the pixel electrode includes a cross-shaped stem portion including a horizontal stem portion and a vertical stem portion intersecting the horizontal stem portion and a plurality of fine branches extending from the cross-shaped stem portion, each of the fine branches includes a first portion and a second portion having a width greater than that of the first portion, and the first portion is connected to the cross-shaped stem portion.

An extending line from the boundary between the first portion and the second portion may be parallel to the vertical stem portion.

The first substrate may include a first pixel, a second pixel, and a third pixel, and the first pixel may be provided such that the first portion is disposed on both sides of the vertical stem portion in plan view.

The second pixel may be provided such that the first portion is disposed only on the right side of the vertical stem portion in plan view.

The third pixel may be provided such that the first portion is disposed only on the left side of the vertical stem portion in plan view.

When the first substrate is trisected in a Y-axis direction, the first substrate may include a central portion, a left outer portion disposed on the left side of the central portion, and a right outer portion disposed on the right side of the central portion.

The first pixel may be disposed in the central portion.

The second pixel may be disposed in the left outer portion.

The third pixel may be disposed in the right outer portion.

An extending line from the boundary between the first portion and the second portion may be parallel to the horizontal stem portion.

The first substrate may include a fourth pixel, a fifth pixel, and a sixth pixel, and the fourth pixel may be provided such that the first portion is disposed above and below the horizontal stem portion in plan view.

The fifth pixel may be provided such that the first portion is disposed only below the horizontal stem portion in plan view.

The sixth pixel may be provided such that the first portion is disposed only above the horizontal stem portion in plan view.

When the first substrate is trisected in an X-axis direction, the first substrate may include a central portion, an upper outer portion disposed above the central portion, and a lower outer portion disposed below the central portion.

The fourth pixel may be disposed in the central portion.

The fifth pixel may be disposed in the upper outer portion.

The sixth pixel may be disposed in the lower outer portion.

An exemplary embodiment of the present invention provides a curved display device including a first substrate, a thin film transistor (TFT) disposed on the first substrate, a pixel electrode connected to the TFT, a second substrate overlapping the first substrate, a liquid crystal layer disposed between the first substrate and the second substrate, and a common electrode disposed between the second substrate and the liquid crystal layer, in which the pixel electrode includes a cross-shaped stem portion including a horizontal stem portion and a vertical stem portion intersecting the horizontal stem portion, and a plurality of fine branches extending from the cross-shaped stem portion, at least one of the plurality of the fine branches includes a first portion and a second portion having a width greater than that of the first portion, and an extending line from a boundary between the first portion and the second portion is sloped at an angle in a range of −10 degrees to +10 degrees with respect to the vertical stem portion.

An exemplary embodiment of the present invention provides a curved display device including a first substrate, a thin film transistor (TFT) disposed on the first substrate, a pixel electrode connected to the TFT, a second substrate overlapping the first substrate, a liquid crystal layer disposed between the first substrate and the second substrate, and a common electrode disposed between the second substrate and the liquid crystal layer, in which the pixel electrode includes a cross-shaped stem portion including a horizontal stem portion and a vertical stem portion intersecting the horizontal stem portion, and a plurality of fine branches extending from the cross-shaped stem portion, at least one of the plurality of the fine branches includes a first portion and a second portion having a width greater than that of the first portion, and an extending line from a boundary between the first portion and the second portion is sloped at an angle in a range of −10 degrees to +10 degrees with respect to the horizontal stem portion.

According to an embodiment of the present invention, since the fine branch has a first portion and a second portion having different widths and the first portion having a smaller width is connected to the cross-shaped stem portion, texture may be improved, thus enhancing transmittance of the curved display device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE ILLUSTRATED EMBODIMENTS

Figure 1A:
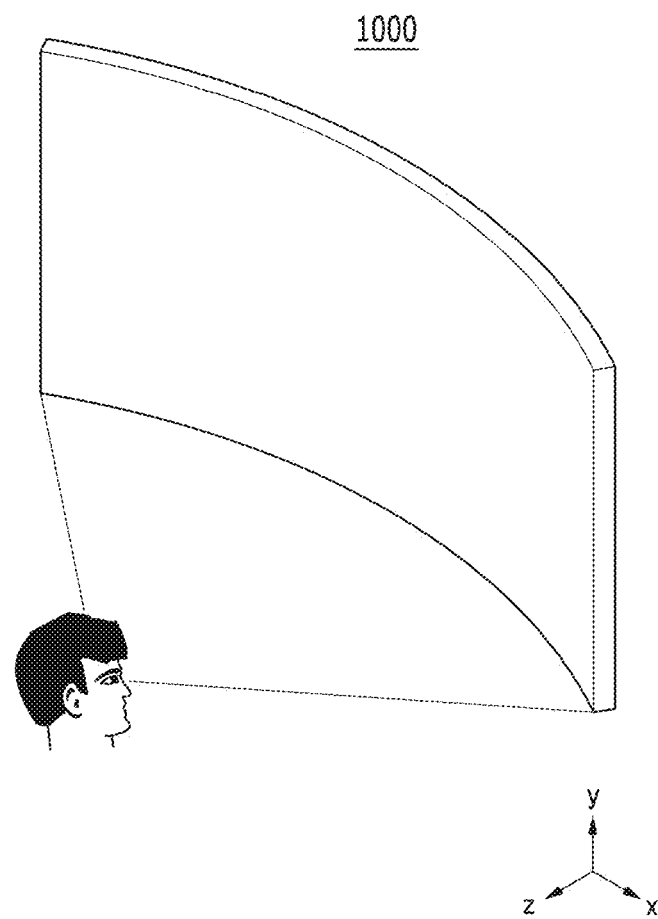
FIGS. 1A and 1B are schematic perspective views of curved display devices according to exemplary embodiments of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clarify the present invention, portions irrespective of description are limited and like numbers refer to like elements throughout the specification.

Also, in the drawings, sizes and thickness of components are arbitrarily shown for the description purposes, so the present invention is not limited to the illustrations of the drawings.

In the drawings, the thickness of layers, films, panels, regions, etc., are exaggerated for clarity. In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present.

Throughout the specification, unless explicitly described to the contrary, the word "comprise" and variations such as "comprises" or "comprising", will be understood to imply the inclusion of stated elements but not the exclusion of any other elements. Throughout the specification, when an electrode is referred to as being "on", it may be positioned on or under another element and does not necessarily positioned above with respect to a gravitation direction.

Throughout the specification, when it is referred to "in plan view", it means that a target element is viewed from above, and when it is referred to "in cross-sectional view", it means that a target element taken vertically is viewed from the side.

A curved display device according to an exemplary embodiment of the present invention will be described with reference to FIGS. 1 through 5.

FIG. 1A is a schematic perspective view of a curved display device according to an exemplary embodiment of the present invention.

Referring to FIG. 1A, a curved display device 1000 according to an exemplary embodiment of the present invention may be curved in a horizontal direction as a longer axis or in a vertical direction as a shorter axis. In the present exemplary embodiment, the curved display device 1000 will be described, but the present invention may not be limited thereto and may also be applied to a flat panel type display. The curved display device 1000 includes a plurality of pixels displaying an image.

Figure 1B:
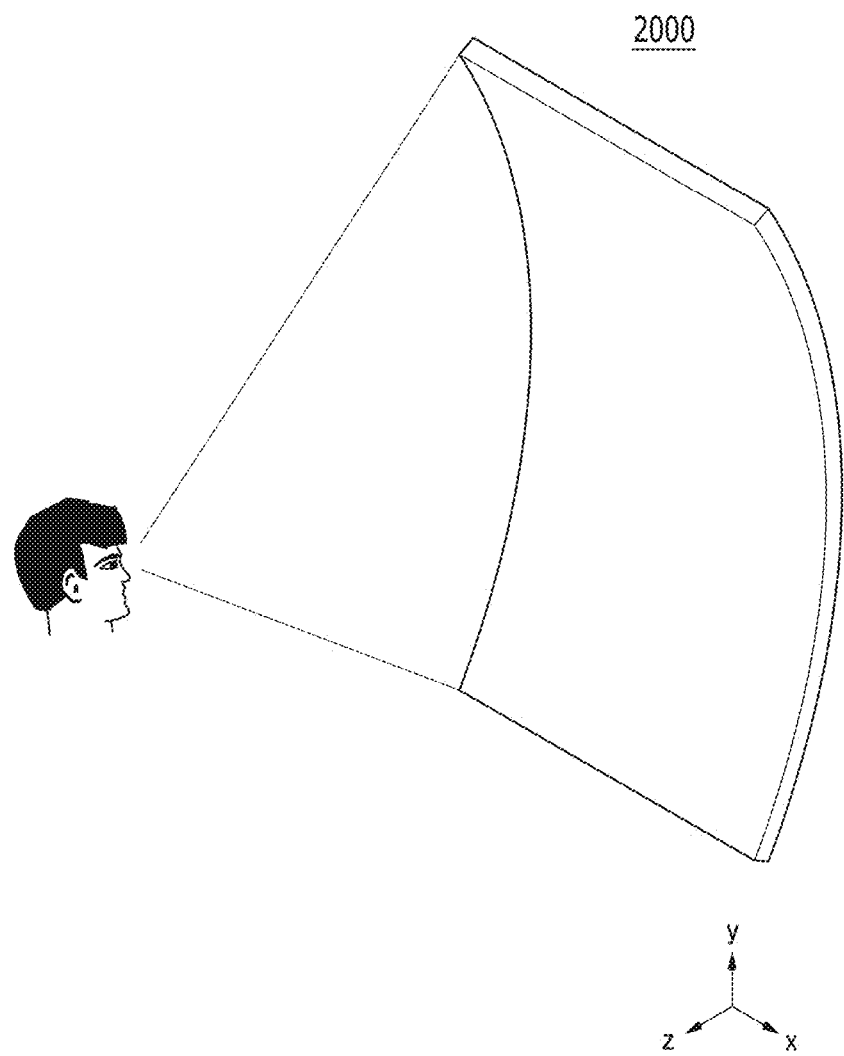

FIG. 1B shows another embodiment of a curved display device curved along Y-axis direction.

Figure 2:
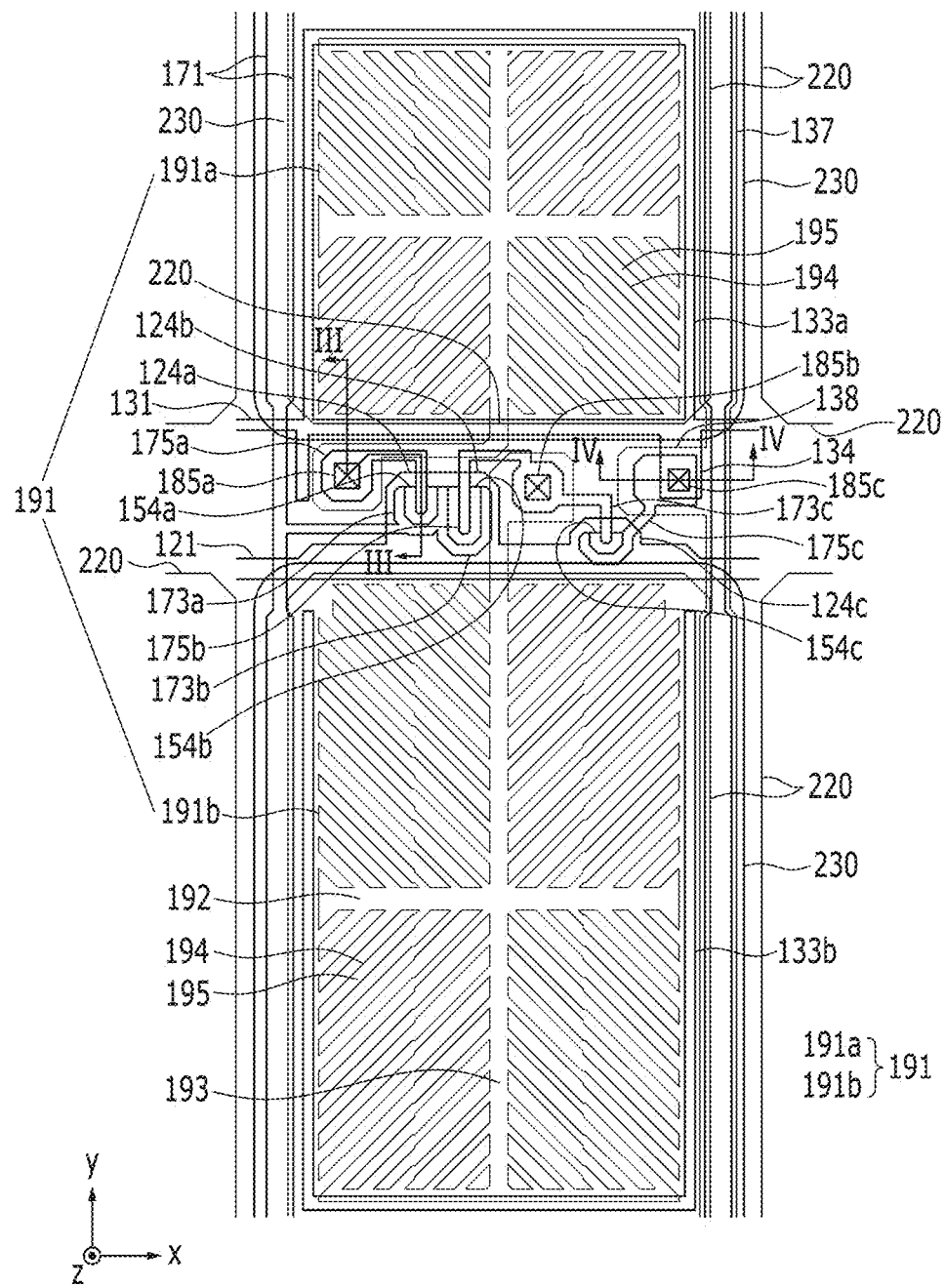
FIG. 2 is a layout view of a pixel of the curved display device of FIG. 1A.
Figure 3:
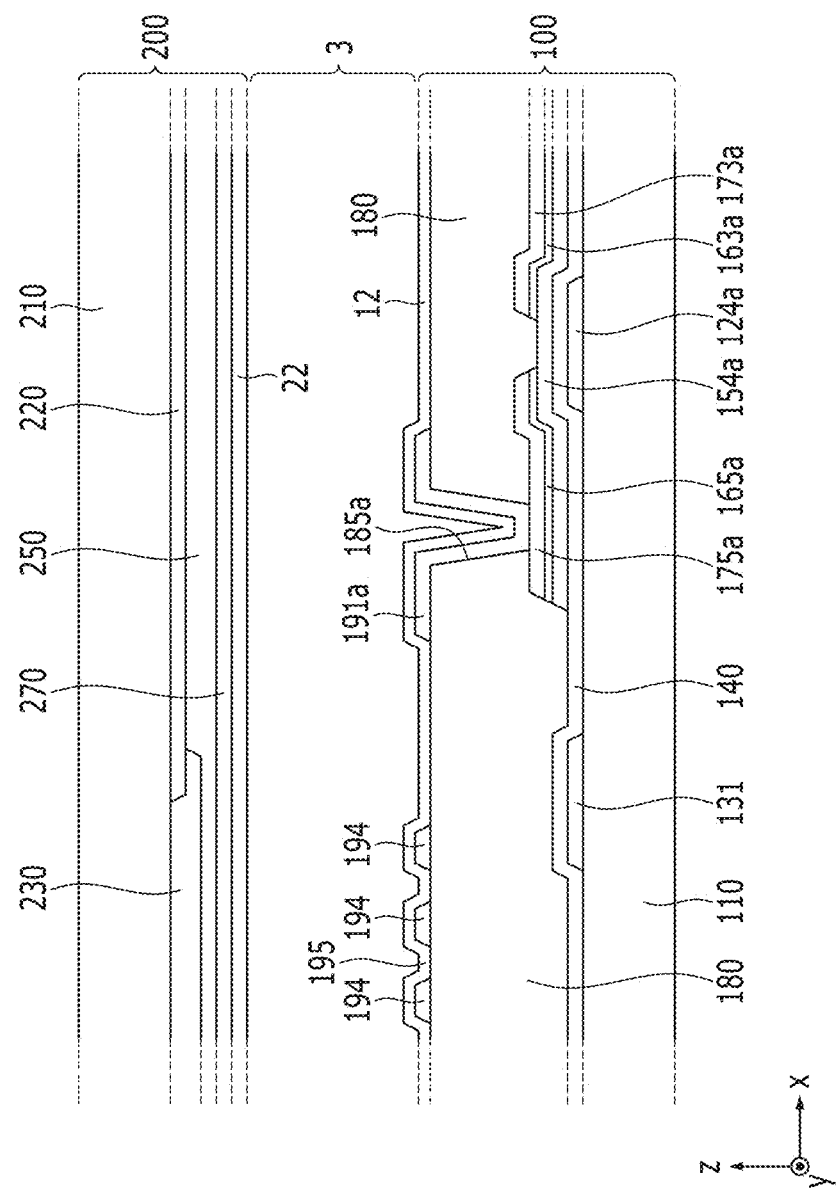
FIG. 3 is a cross-sectional view taken along line III-III of FIG. 2.
Figure 4:
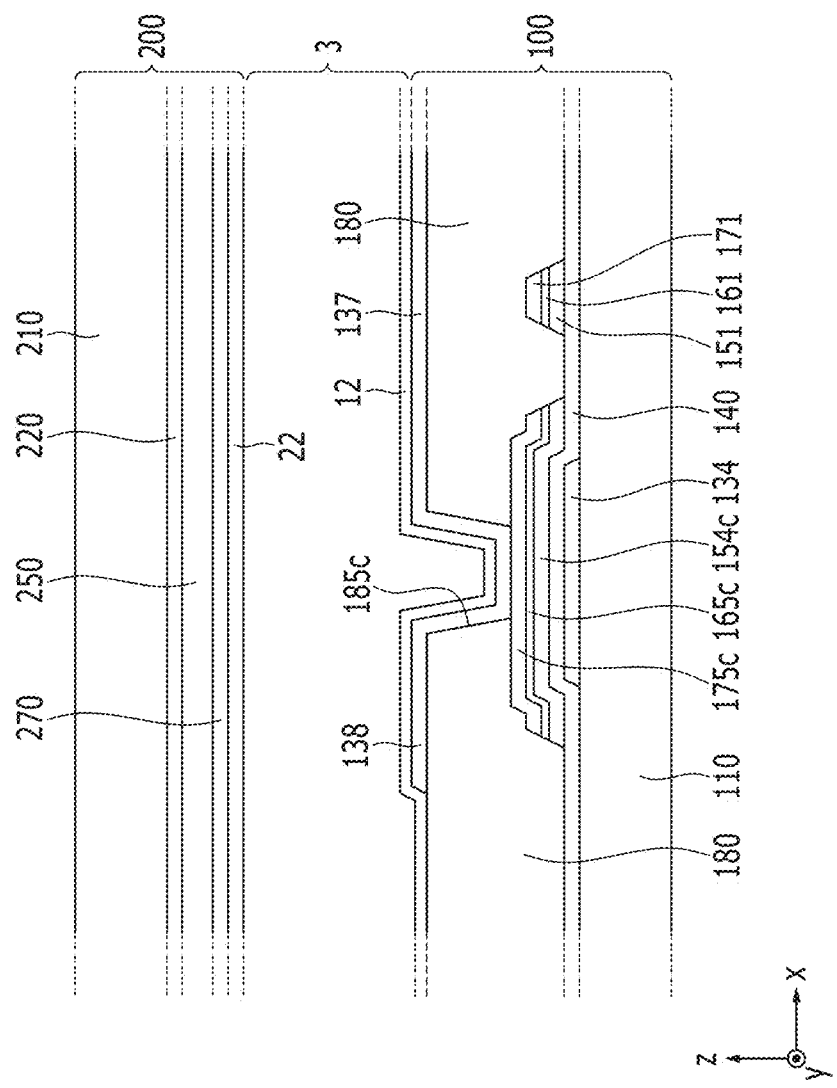
FIG. 4 is a cross-sectional view taken along line IV-IV of FIG. 2.
Figure 5:
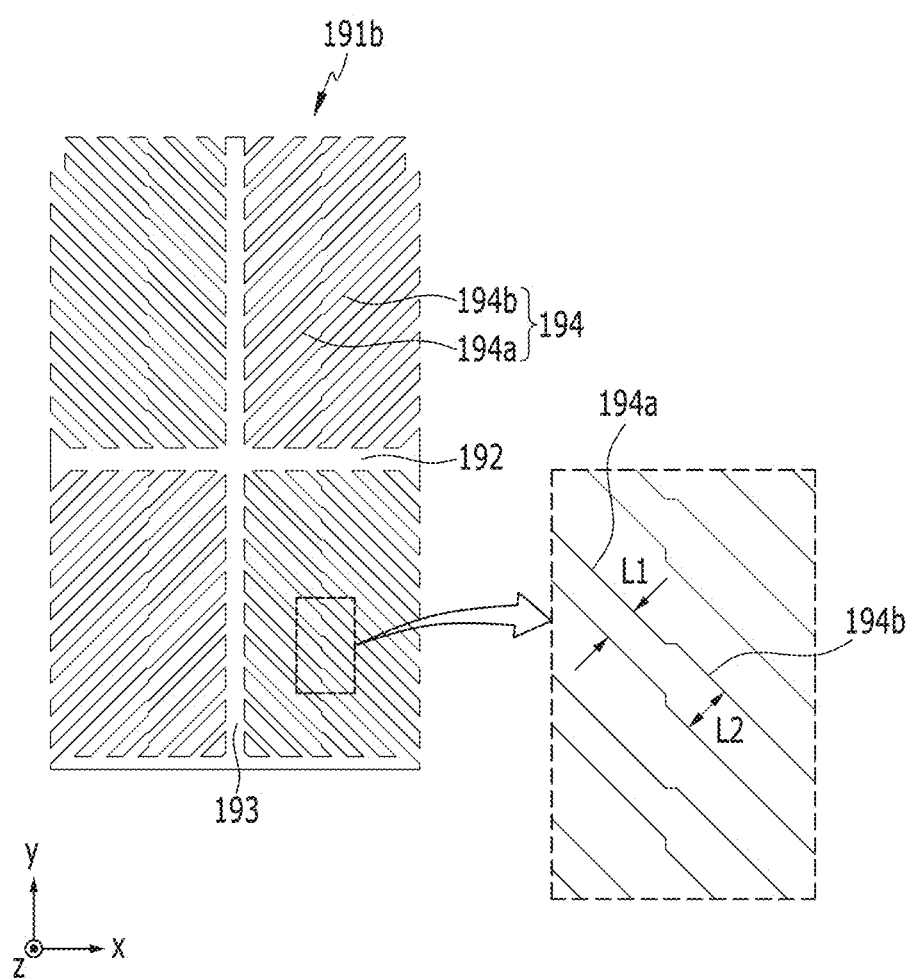
FIG. 5 is an enlarged view of a pixel electrode of FIG. 2.

FIG. 2 is a layout view of a pixel of the curved display device of FIG. 1A. FIG. 3 is a cross-sectional view taken along line III-III of FIG. 2. FIG. 4 is a cross-sectional view taken along line IV-IV of FIG. 2. FIG. 5 is an enlarged view of a pixel electrode of FIG. 2.

Referring to FIGS. 2 and 5, the curved display device according to the present exemplary embodiment includes a first display substrate 100, a second display substrate 200 facing one another, and a liquid crystal layer 3 interposed between the first and second display substrates 100 and 200.

Hereinafter, the first display substrate 100 will be described.

A gate line 121 and a reference voltage line 131 are disposed on a first substrate 110 formed of transparent glass, plastic, and the like.

The gate line 121 extends mainly in a horizontal direction, transmits a gate signal, and includes a first gate electrode 124a, a second gate electrode 124b, and a third gate electrode 124c.

The reference voltage line 131 extends mainly in the horizontal direction, transmits a predetermined voltage such as a reference voltage, and includes a first reference electrode 133a surrounding a first subpixel electrode 191a and a protrusion 134 protruding in a direction toward the gate line 121

Also, a second reference electrode 133b surrounding a second subpixel electrode 191b described hereinafter is disposed. Although not shown in FIG. 1A, a horizontal portion of the first reference electrode 133a is connected to a horizontal portion of the second reference electrode 133b of a previous pixel, as an integral line.

A gate insulating layer 140 is disposed on the gate line 121 and the reference voltage line 131.

A first semiconductor 154a, a second semiconductor 154b, and a third semiconductor 154c are disposed on the gate insulating layer 140.

A plurality of resistive contact members are disposed on the first semiconductor 154a, the second semiconductor 154b, and the third semiconductor 154c, and here, in FIG. 2, only the resistive contact members 163a and 164a formed on the first semiconductor 154a are illustrated, and in FIG. 3, only the resistive contact member 165c formed on the third semiconductor 154c is illustrated. This is because a cross-section of other portions is not taken.

A plurality of data lines 171 including a first source electrode 173a and a second source electrode 173b and data conductors 171, 173c, 175a, 175b, and 175c including a first drain electrode 175a, a second drain electrode 175b, and a third source electrode 173c and a third drain electrode 175c are disposed on the resistive contact members 163a, 165a, and 165c and the gate insulating layer 140. The third drain electrode 715c overlaps with a protrusion 134 of the reference voltage line 131.

The first gate electrode 124a, the first source electrode 173a, and the first drain electrode 175a form a first thin film transistor (TFT) together with the first semiconductor 154a, and a channel of the first TFT is formed in a semiconductor portion 154a between the first source electrode 173a and the first drain electrode 175a.

Similarly, the second gate electrode 124b, the second source electrode 173b, and the second drain electrode 175b form a second TFT together with the second semiconductor 154b, a channel of the second TFT is formed in the semiconductor portion 154b between the second source electrode 173b and the second drain electrode 175b, the third gate electrode 124c, the third source electrode 173c, and the third drain electrode 175c form a third TFT together with the third semiconductor 154c, and a channel of the third TFT is formed in the semiconductor portion 154c between the third source electrode 173c and the third drain electrode 175c.

A passivation layer 180 is disposed on the data conductors 171, 173c, 175a, 175b, and 175c and the exposed portions of the semiconductors 154a, 154b, and 154c. The passivation layer 180 may be formed of an organic insulating material and may have a smooth surface.

The passivation layer 180 may have a dual-layer structure including a lower inorganic layer and an upper organic layer so as not to damage the exposed portions of the semiconductors 154a, 154b, and 154c, while saving excellent insulating properties of the organic layer.

In the passivation layer 180, a first contact hole 185a, a second contact hole 185b, and a third contact hole 185c, exposing the first drain electrode 175a, the second drain electrode 175b, and the third drain electrode 175c, respectively, are disposed.

A pixel electrode 191 including a first subpixel electrode 191a and a second subpixel electrode 191b and an auxiliary voltage line 137 are disposed on the passivation layer 180. The pixel electrode 191 and the auxiliary voltage line 137 may be formed of a transparent conductive material such as ITO or IZO or a reflective metal such as aluminum, silver, chromium, or an alloy thereof.

The first subpixel electrode 191a and the second subpixel electrode 191b neighbor in a column direction, have an overall quadrangular shape, and include a cross-shaped stem portion including a horizontal stem portion 192 and a vertical stem portion 193 intersecting the horizontal stem portion 192.

The first subpixel electrode 191a and the second subpixel electrode 191b are divided into four sub-regions by the horizontal stem portion 192 and the vertical stem portion 193, respectively, and each sub-region includes a plurality of fine branches 194 and a plurality of fine slits 195. Each slit 195 is disposed between adjacent fine branches 194.

One of the plurality of fine branches 194 of the first subpixel electrode 191a and the second subpixel electrode 191b extends slantingly from the horizontal stem portion 192 or the vertical stem portion 193 in a left-upward direction, and the other fine branch 194 extends slantingly from the horizontal stem portion 192 or the vertical stem portion 193 in a right-upward direction. Also, the other fine branch 194 extends slantingly from the horizontal stem portion 192 or the vertical stem portion 193 in a left-downward direction, and the other remaining fine branch 194 extends slantingly from the horizontal stem portion 192 or the vertical stem portion 193 in a right-downward direction.

Each fine branch 194 makes an angle of substantially ranging from 40 degrees to 45 degrees with the gate line 121 or the horizontal stem portion 192. In particular, the fine branches 194 included in the first subpixel electrode 191a may make an angle of substantially 40 degrees with the horizontal stem portion 192, and the fine branches 194 included in the second subpixel electrode 191b may make an angle of substantially 45 degrees with the horizontal stem portion 192. Fine branches 194 of two neighboring sub-regions may be perpendicular to each other.

Each fine branch 194 includes a first portion 194a and a second portion 194b. One side of the first portion 194a is connected to the vertical stem portion 193 and the horizontal stem portion 192, and the other side of the first portion 194a is connected to the second portion 194b. A width L2 of the second portion 194b is greater than a width L1 of the first portion 194a.

Here, the first portions 194a of the fine branch 194 are disposed on both sides of the vertical stem portion 193 in plan view. That is, each of the first portions 194a is connected to the vertical stem portion 193 on both sides of the vertical stem portion 193.

The first portion 194a connected to the horizontal stem portion 192 is connected only to the horizontal stem portion 192 in a portion adjacent to the portion where the vertical stem portion 193 and the horizontal stem portion 192 intersect.

Also, an extending line from the boundary between the first portion 194a and the second portion 194b may be parallel to the vertical stem portion 193, or may be sloped at an angle ranging from −10 degrees to +10 degrees with respect to a certain line parallel to the vertical stem portion 193.

In FIG. 5, only the second subpixel electrode 191b is enlarged to be illustrated, but the fine branch 194 of the first subpixel electrode 191 has the same shape as that of the fine branch 194 of the second subpixel electrode 191b.

The first subpixel electrode 191a and the second subpixel electrode 191b are physically, electrically connected to the first drain electrode 175a and the second drain electrode 175b through the contact holes 185a and 185b, respectively, and receive a data voltage from the first drain electrode 175a and the second drain electrode 175b. Here, a portion of the data voltage applied to the second drain electrode 175b is divided through the third source electrode 173c, and thus, a magnitude of the voltage applied to the second subpixel electrode 191b is smaller than that of the voltage applied to the first subpixel electrode 191a. In this case, the voltage applied to the first subpixel electrode 191a and the second subpixel electrode 191b has a positive polarity (+), and conversely, when the voltage applied to the first subpixel electrode 191a and the second subpixel electrode 191b has a negative polarity (−), a magnitude of the voltage applied to the first subpixel electrode 191a is smaller than that applied to the second subpixel electrode 191b.

Here, the area of the second subpixel electrode 191b may be one time to two times the area of the first subpixel electrode 191a.

The auxiliary voltage line 173 is positioned in a portion corresponding to the data line 171, and includes a connection member 138 extending toward the protrusion 134 of the reference voltage line 131. The connection member 138 is connected to the third drain electrode 175 through the third contact hole 185c. Since a reference voltage Vcst is applied to the protrusion 134 of the reference voltage line 131, the reference voltage Vcst has a predetermined voltage value, and the reference voltage Vcst is applied to the third TFT through the third drain electrode 175c. As a result, the voltage applied to the second subpixel electrode 191b is lowered.

A first alignment layer 12 is formed on the pixel electrode 191.

Hereinafter, the second display substrate 200 will be described.

A light blocking member 220 is formed on a second substrate 210 formed of a transparent glass, plastic, and the like. The light blocking member 220 is also called a black matrix, preventing light leakage.

A plurality of color filters 230 are formed on the second substrate 201 and the light blocking member 220. The color filters 230 mostly exist within a region surrounded by the light blocking member 220, and may extend along the column of the pixel electrode 191. Each color filter 230 may display one of primary colors such as red, green, and blue colors. However, each color filter 230 may also display one of cyan, magenta, yellow, and white-based colors, without being limited to the primary colors of red, green, and blue colors.

At least one of the light blocking member 220 and the color filters 230 may be formed on the first substrate 110.

An overcoat 250 is formed on the color filters 230 and the light blocking member 220. The overcoat 250 may be formed of an insulating material, prevent exposure of the color filter 230, and provides a smooth surface. The overcoat 250 may be omitted.

A common electrode 270 is formed on the overcoat 250, and a second alignment layer 22 is formed on the common electrode 270.

Polarizers (not shown) are provided on outer surfaces of the first and second display substrates 100 and 200, and polarizing axes of the two polarizers are perpendicular, and preferably, one of the two polarizing axes is parallel to the gate line 121. One of the two polarizers may be omitted in case of a reflective liquid crystal display device.

Simulation results of the curved display device according to an exemplary embodiment of the present invention will be described with reference to FIG. 6 and Table 1.

Figures 6A, 6B:
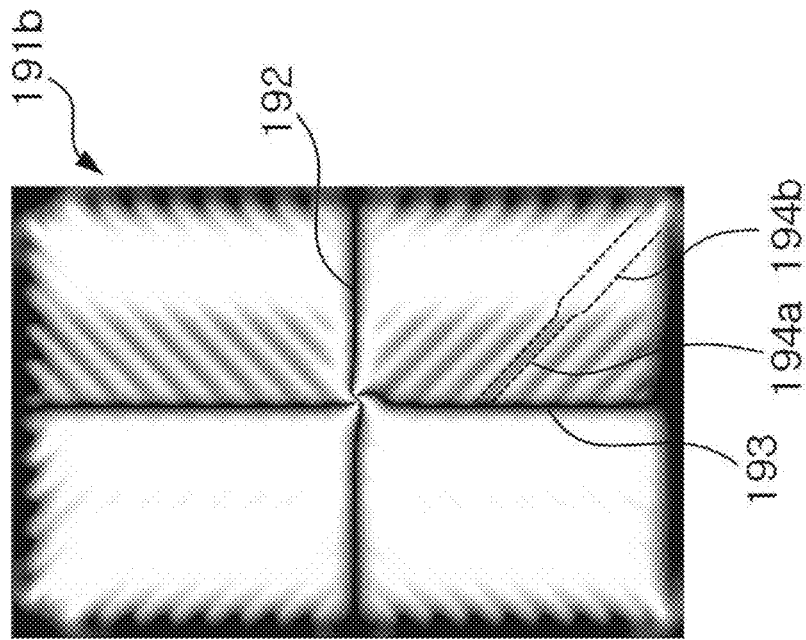
FIG. 6A is a view illustrating a simulation result of a curved display device in which a fine branch of a pixel electrode has a uniform width.
FIG. 6B is a view illustrating a simulation result of a curved display device according to an exemplary embodiment of the present invention.

FIG. 6A is a view illustrating a simulation result of a curved display device in which a fine branch of a pixel electrode has a uniform width, and FIG. 6B is a view illustrating a simulation result of a curved display device according to an exemplary embodiment of the present invention.

In FIG. 6, the light blocking member disposed on the second display substrate is shifted by 20 μm due to the curved surface. Also, in FIG. 6A, a width of the fine branch is 3.4 μm and a width of the fine slit is 2.6 μm. In FIG. 6B, a width of the first portion of the fine branch is 2.6 μm, and a width of the second portion is 3.4 μm. A width of the fine slit between mutually adjacent first portions is 3.4 μm, and a width of a fine slit between mutually adjacent second portions is 2.6 μm.

Referring to FIG. 6, in the case of the curved display device of FIG. 6A, it can be seen that texture appears in the vicinity of the vertical stem portion of the pixel electrode, and in the case of the curved display device of FIG. 6B, texture in the vicinity of the vertical stem portion of the pixel electrode is improved compared with the case of FIG. 6A. That is, it can be seen that transmittance of the curved display device in which a fine branch has the uniform width is lower than transmittance of the curved display device according to the present exemplary embodiment in which the fine branch has different widths.

Table 1 shows brightness of the curved display device of FIGS. 6A and 6B before and after shifting.

Referring to Table 1, in the case of the curved display device of FIG. 6A, it can be seen that brightness after shifting is reduced by 13% compared with brightness before shifting, and in the case of the curved display device of FIG. 6B, it can be seen that brightness after shifting is reduced by 11% compared with brightness before shifting. That is, it can be is seen that a decrement of brightness of the curved display device before and after shifting according to the present exemplary embodiment is smaller than a decrement of brightness of the curved display device in which the width of the fine branch is uniform.

TABLE 1

|  | FIG. 6A | FIG. 6B |
| --- | --- | --- |
| Luminance before shifting | 0.23878 | 0.23923 |
| Luminance after shifting | 0.20739 | 0.21173 |
| Variation in luminance before and after shifting | −13% | −11% |

In this manner, in the curved display device 1000, since the fine branch 194 includes the first portion 194a and the second portion 194b having different widths, and the first portion 194a having a smaller width is connected to the cross-shaped stem portion, texture may be improved to enhance transmittance. Also, a brightness decrement before and after shifting may be improved.

Another pixel of the curved display device of FIG. 1A will be described with reference to FIGS. 7 and 8.

A structure of another pixel of the curved display device of FIG. 1A is the same as that of the pixel of FIG. 2, except for a position in which the first portion of the fine branch is disposed. Thus, only pixel electrodes disposed in different pixels of the curved display device of FIG. 1a schematically illustrated in FIGS. 7 and 8 will be described.

Figure 7:
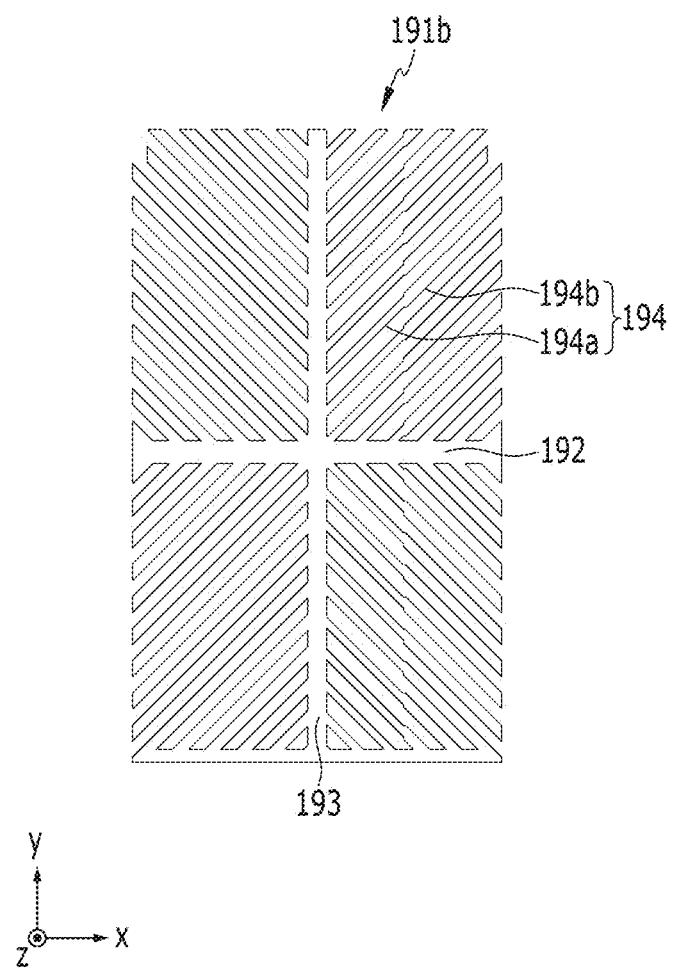
FIGS. 7 and 8 are views schematically illustrating pixel electrodes disposed in different pixels of the curved display device of FIG. 1A.
Figure 8:
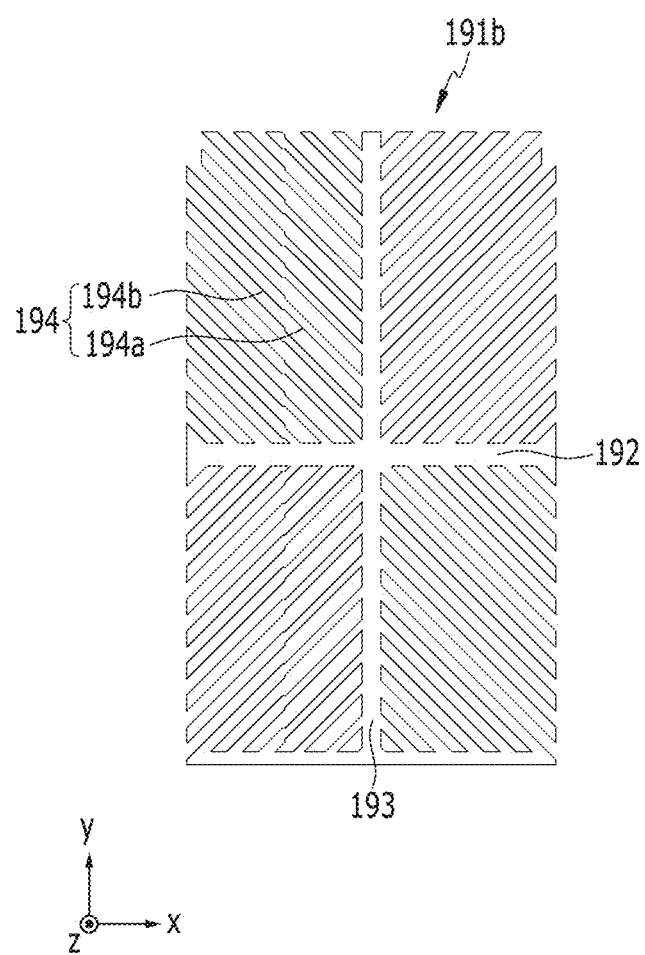

FIGS. 7 and 8 are views schematically illustrating pixel electrodes disposed in different pixels of the curved display device of FIG. 1A. Here, since the shape of the fine branch of the first subpixel electrode is the same as that of the fine branch of the second subpixel electrode, only the second subpixel electrode illustrated in FIGS. 7 and 8 will be described.

Referring to FIG. 7, a first portion 194a of the fine branch 194 is disposed only on the right side of the vertical stem portion 193 in plan view. That is, the first portion 194a of the fine branch 194 is connected to the right side of the vertical stem portion 193. Also, the first portion 194a of the fine branch 194 is also connected to the horizontal stem portion 192 at the portion adjacent to the portion in which the vertical stem portion 193 and the horizontal stem portion 192 intersect. Also, an extending line from the boundary between the first portion 194a and the second portion 194b may be parallel to the vertical stem portion 193, or may be sloped at an angle ranging from −10 degrees to +10 degrees with respect to a certain line parallel to the vertical stem portion 193.

Referring to FIG. 8, the first portion 194a of the fine branch 194 is disposed only on the left side of the vertical stem portion 193 in plan view. That is, the first portion 194a of the fine branch 194 is connected to the left side of the vertical stem portion 193. Also, the first portion 194a of the fine branch 194 is also connected to the horizontal stem portion 192 at the portion adjacent to the portion in which the vertical stem portion 193 and the horizontal stem portion 192 intersect. Also, an extending line from the boundary between the first portion 194a and the second portion 194b may be parallel to the vertical stem portion 193, or may be sloped at an angle ranging from −10 degrees to +10 degrees with respect to a certain line parallel to the vertical stem portion 193.

A pixel layout of the curved display device of FIG. 1A will be described with reference to FIG. 9.

Figure 9:
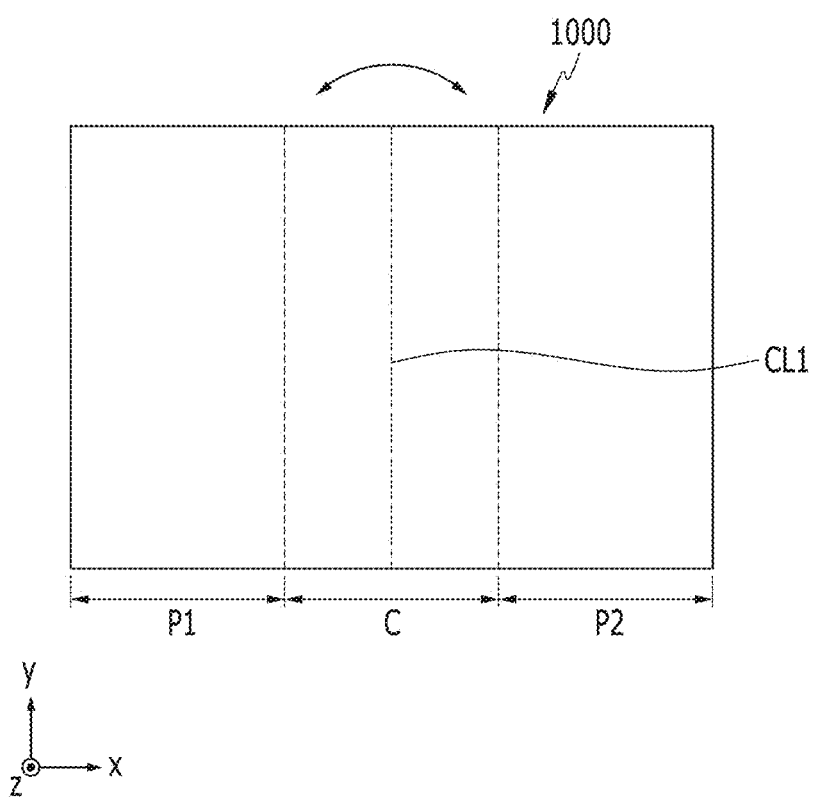
FIG. 9 is a plan view briefly illustrating the curved display device of FIG. 1A.

FIG. 9 is a plan view briefly illustrating the curved display device of FIG. 1A.

Referring to FIG. 9, the curved display device 1000 according to the present exemplary embodiment is curved in an X-axis direction with respect to a vertical central line CL1 extending along a Y axis. The curved display device 1000 includes a central portion C and a left outer portion P1 and a right outer portion P2 respectively disposed on the left and right of the central portion C in plan view. Here, the central portion C indicates a central portion when the curved display device 1000 is trisected in the Y-axis direction.

The pixel having the structure of FIG. 2 is disposed in the central portion C. That is, the pixel in which the first portion 194a of the fine branch 194 is disposed on both sides of the vertical stem portion 193 in plan view is disposed in the central portion C of the curved display device 1000.

The pixel having the structure of FIG. 7 is disposed in the left outer portion P1. That is, the pixel in which the first portion 194a of the fine branch 194 is disposed on the right side of the vertical stem portion 193 is disposed in the left outer portion P1 of the curved display device 1000 in plan view.

The pixel having the structure of FIG. 8 is disposed in the right outer portion P2. That is, the pixel in which the first portion 194a of the fine branch 194 is disposed on the left side of the vertical stem portion 193 is disposed in the right outer portion P2 of the curved display device 1000 in plan view.

Hereinafter, a curved display device according to another exemplary embodiment of the present invention will be described with reference to FIGS. 10 through 13.

Figure 10:
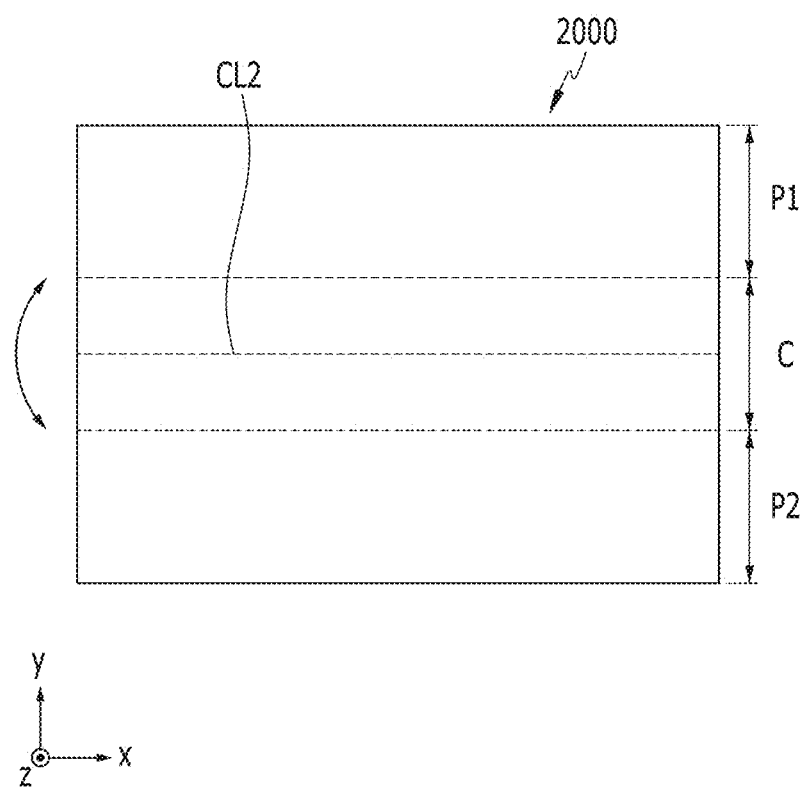
FIG. 10 is a plan view briefly illustrating a curved display device according to another exemplary embodiment of the present invention.

FIG. 10 is a plan view briefly illustrating a curved display device according to another exemplary embodiment of the present invention.

Referring to FIG. 10, a curved display device 2000 according to the present exemplary embodiment is curved in the Y-axis direction with respect to a horizontal central line CL2 extending along the X axis. The curved display device 2000 includes a central portion C and an upper outer portion P1 and a lower outer portion P2 respectively disposed above and below the central portion C in plan view. Here, the central portion C is a central portion when the curved display device 2000 is trisected in the X-axis direction.

Figure 11:
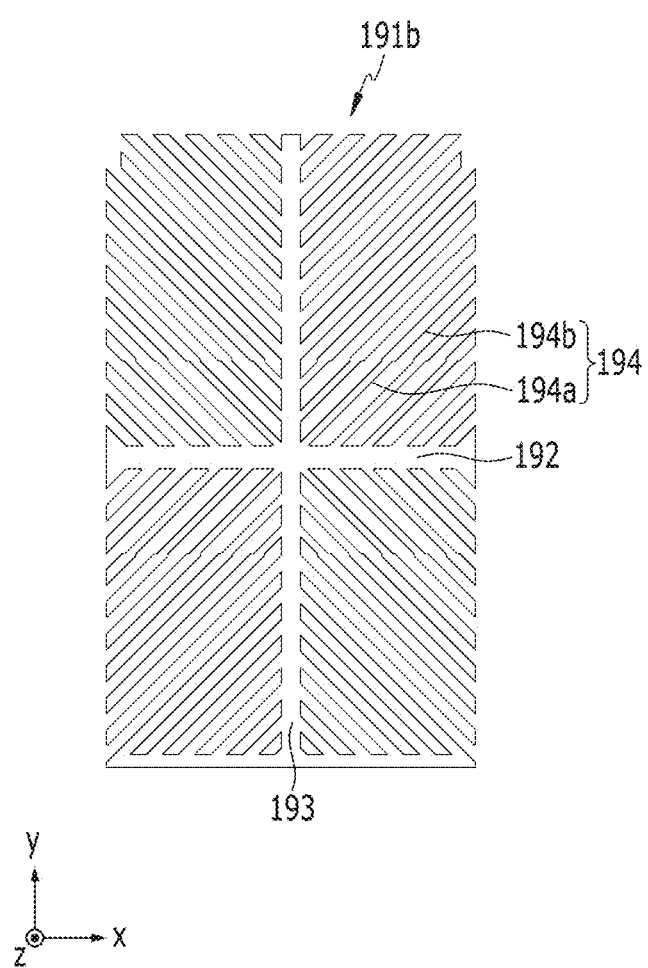
FIGS. 11 through 13 are views illustrating a pixel structure of the curved display device of FIG. 10.
Figure 12:
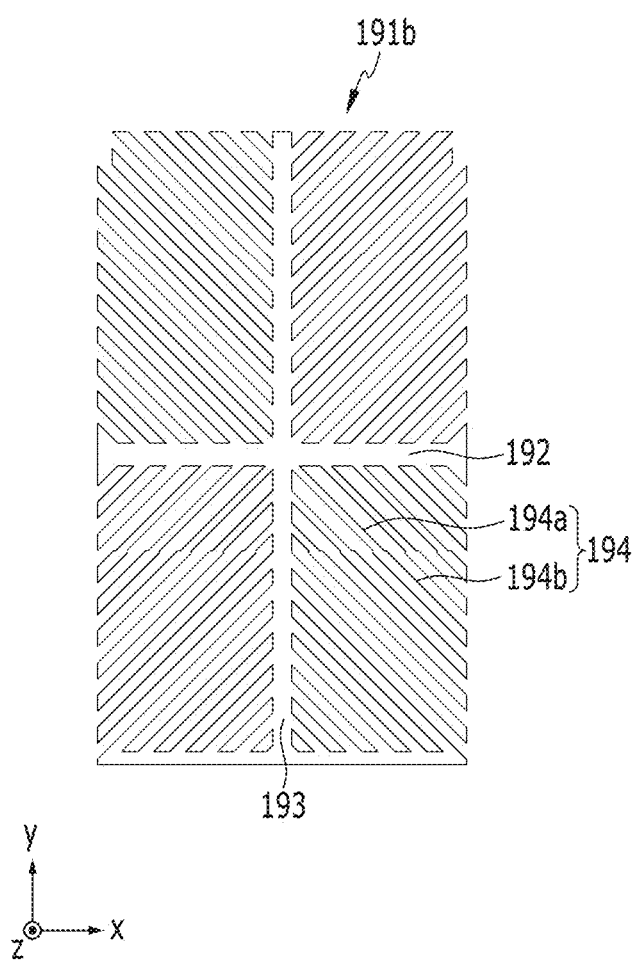
Figure 13:
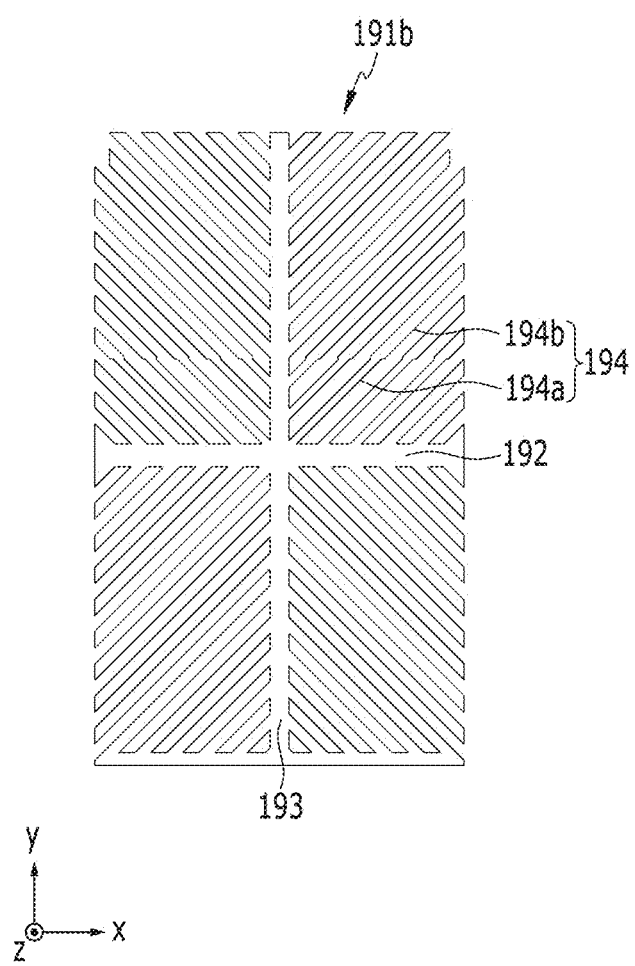

FIGS. 11 through 13 are views illustrating a pixel structure of the curved display device of FIG. 10.

Referring to FIGS. 11 through 13, a pixel structure of the curved display device of FIG. 10 has the same structure as that of FIG. 2, except for a position in which a first portion of a fine branch is disposed. Thus, only the pixel electrode disposed in the curved display device of FIG. 10 illustrated in FIGS. 11 through 13 will be described. Also, the shape of the fine branch of the first subpixel electrode is the same as that of the fine branch of the second subpixel electrode, and thus, only the second subpixel electrode 191b illustrated in FIGS. 11 through 13 will be described.

Referring to FIG. 11, the first portion 194a of the fine branch 194 is disposed above and below the horizontal stem portion 192 in plan view. That is, the first portion 194a of the fine branch 194 is connected to the upper and lower portions of the horizontal stem portion 192 in plan view. Also, the first portion 194a of the fine branch 194 is also connected to the vertical stem portion 193 at the portion adjacent to the portion in which the vertical stem portion 193 and the horizontal stem portion 192 intersect. Also, an extending line from the boundary between the first portion 194a and the second portion 194b may be parallel to the horizontal stem portion 192, or may be sloped at an angle ranging from −10 degrees to +10 degrees with respect to a certain line parallel to the horizontal stem portion 192.

The pixel having such a structure is disposed in the central portion C of the curved display device 2000.

Referring to FIG. 12, the first portion 194a of the fine branch 194 is disposed only below the horizontal stem portion 192 in plan view. That is, the first portion 194a of the fine branch 194 is connected to the lower portion of the horizontal stem portion 192 in plan view. Also, the first portion 194a of the fine branch 194 is also connected to the vertical stem portion 193 at the portion adjacent to the portion in which the vertical stem portion 193 and the horizontal stem portion 192 intersect. Also, an extending line from the boundary between the first portion 194a and the second portion 194b may be parallel to the horizontal stem portion 192, or may be sloped at an angle ranging from −10 degrees to +10 degrees with respect to a certain line parallel to the horizontal stem portion 192.

The pixel having such a structure is disposed in the upper outer portion P1 of the curved display device.

Referring to FIG. 13, the first portion 194a of the fine branch 194 is disposed above the horizontal stem portion 192 in plan view. That is, the first portion 194a of the fine branch 194 is connected to the upper portion of the horizontal stem portion 192 in plan view. Also, the first portion 194a of the fine branch 194 is also connected to the vertical stem portion 193 at the portion adjacent to the portion in which the vertical stem portion 193 and the horizontal stem portion 192 intersect. Also, an extending line from the boundary between the first portion 194a and the second portion 194b may be parallel to the horizontal stem portion 192, or may be sloped at an angle ranging from −10 degrees to +10 degrees with respect to a certain line parallel to the horizontal stem portion 192.

The pixel having such a structure is disposed in the lower outer portion P2 of the curved display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

110: first substrate
121: gate line
124a, 124b, 124c: first, second, and third gate electrode
131: reference voltage line
137: auxiliary voltage line
154a, 154b, 154c: first, second, and third semiconductor
171: data line
173a, 173b, 173c: first, second, and third source electrode
175a, 175b, 175c: first, second, and third drain electrode
191a, 191b: first and second subpixel electrode
192: horizontal stem portion
193: vertical stem portion
194: fine branch
194a: first portion
194b: second portion
210: second substrate
270: common electrode

What is claimed is:

1. A display device comprising:
a first substrate;
a thin film transistor (TFT) disposed on the first substrate;
a pixel electrode connected to the TFT;
a second substrate overlapping the first substrate;
a liquid crystal layer disposed between the first substrate and the second substrate; and
a common electrode disposed between the second substrate and the liquid crystal layer,
wherein:
the pixel electrode comprises a cross-shaped stem portion, the cross-shaped stem portion comprising:
a horizontal stem portion and a vertical stem portion intersecting the horizontal stem portion; and
a plurality of fine branches extending from the cross-shaped stem portion;
at least one of the fine branches comprises a first portion and a second portion having a width greater than that of the first portion; and
an extending line from a boundary between the first portion and the second portion is sloped at an angle in a range of −10 degrees to +10 degrees with respect to the vertical stem portion.

2. The display device of claim 1, wherein:
at least one of the fine branches comprises a plurality of boundaries between the first portion and the second portion; and
the extending line connects the plurality of the boundaries.

3. The display device of claim 1, wherein the extending line is parallel to the vertical stem portion.

4. The display device of claim 3, wherein:
the first substrate comprises a first pixel, a second pixel, and a third pixel; and
the first portion of the first pixel is disposed on both sides of the vertical stem portion in plan view.

5. The display device of claim 4, wherein the first portion of the second pixel is disposed only on the right side of the vertical stem portion in plan view.

6. The display device of claim 5, wherein the first portion of the third pixel is disposed only on the left side of the vertical stem portion in plan view.

7. The display device of claim 6, wherein when the first substrate is trisected in a Y-axis direction, the first substrate comprises a central portion, a left outer portion disposed on the left side of the central portion, and a right outer portion disposed on the right side of the central portion.

8. The display device of claim 7, wherein the first pixel is disposed in the central portion.

9. The display device of claim 8, wherein the second pixel is disposed in the left outer portion.

10. The display device of claim 9, wherein the third pixel is disposed in the right outer portion.

11. A curved display device comprising:
a first substrate;
a thin film transistor (TFT) disposed on the first substrate;
a pixel electrode connected to the TFT;
a second substrate overlapping the first substrate;
a liquid crystal layer disposed between the first substrate and the second substrate; and
a common electrode disposed between the second substrate and the liquid crystal layer,
wherein:
the pixel electrode comprises a cross-shaped stem portion, the cross-shaped step portion comprising:
a horizontal stem portion and a vertical stem portion intersecting the horizontal stem portion; and
a plurality of fine branches extending from the cross-shaped stem portion;
at least one of the fine branches comprises a first portion and a second portion having a width greater than that of the first portion; and
an extending line from a boundary between the first portion and the second portion is sloped at an angle in a range of −10 degrees to +10 degrees with respect to the horizontal stem portion.

12. The display device of claim 11, wherein:
at least one of the fine branches comprises a plurality of boundaries between the first portion and the second portion; and
the extending line connects the plurality of the boundaries.

13. The display device of claim 11, wherein the extending line is parallel to the horizontal stem portion.

14. The display device of claim 13, wherein:
the first substrate comprises a fourth pixel, a fifth pixel, and a sixth pixel; and
the first portion of the fourth pixel is disposed above and below the horizontal stem portion in plan view.

15. The display device of claim 14, wherein the first portion of the fifth pixel is disposed only below the horizontal stem portion in plan view.

16. The display device of claim 15, wherein the first portion of the sixth pixel is disposed only above the horizontal stem portion in plan view.

17. The display device of claim 16, wherein when the first substrate is trisected in an X-axis direction, the first substrate comprises a central portion, an upper outer portion disposed above the central portion, and a lower outer portion disposed below the central portion.

18. The display device of claim 17, wherein the fourth pixel is disposed in the central portion.

19. The display device of claim 18, wherein the fifth pixel is disposed in the upper outer portion.

20. The display device of claim 19, wherein the sixth pixel is disposed in the lower outer portion.

* * * * *